Aug. 27, 1963 P. W. AITKENHEAD 3,102,014
AIR FILTER CURTAIN
Filed May 3, 1961 4 Sheets-Sheet 1

INVENTOR.
PAUL W. AITKENHEAD
BY
William D. Carothers
HIS ATTORNEY

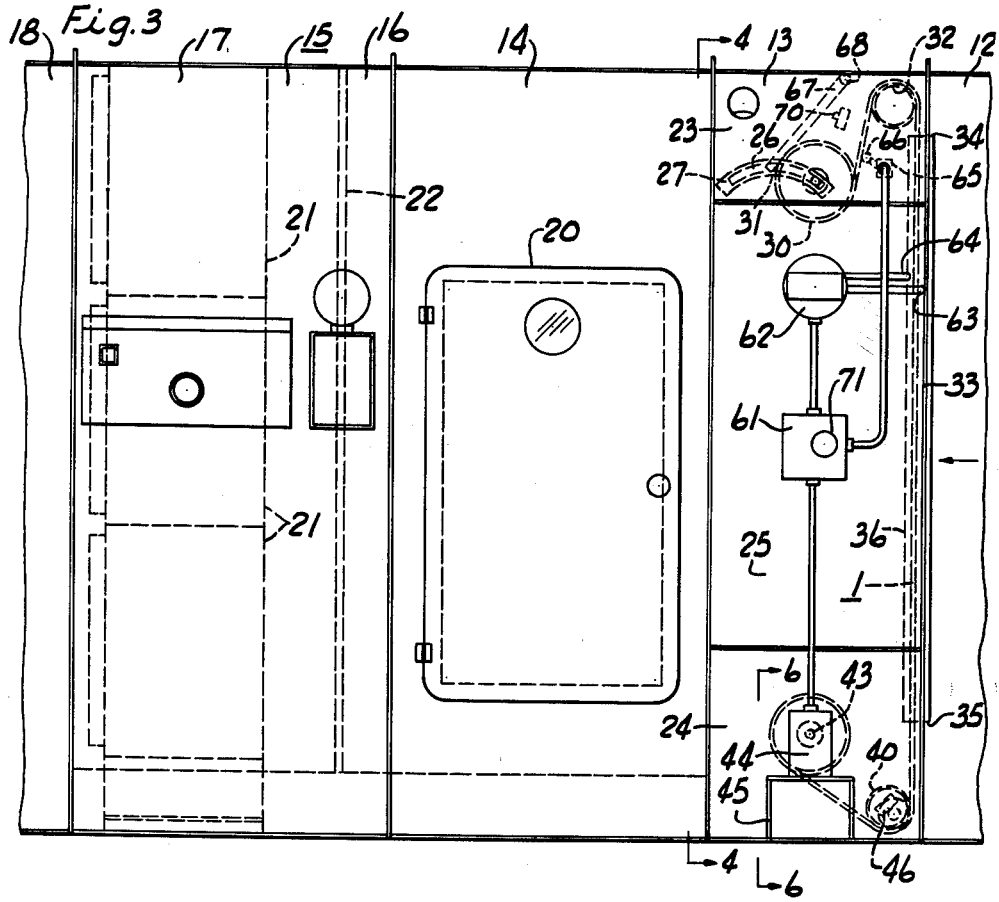
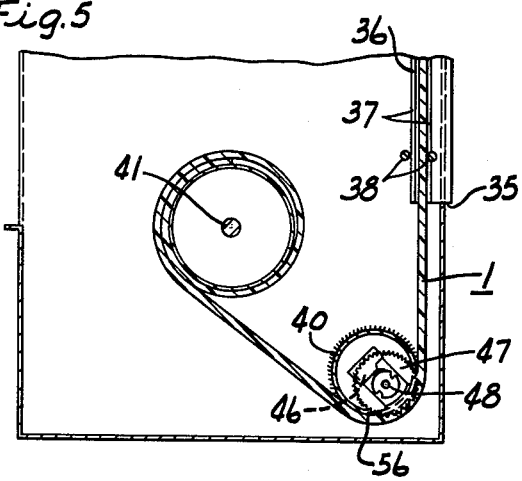

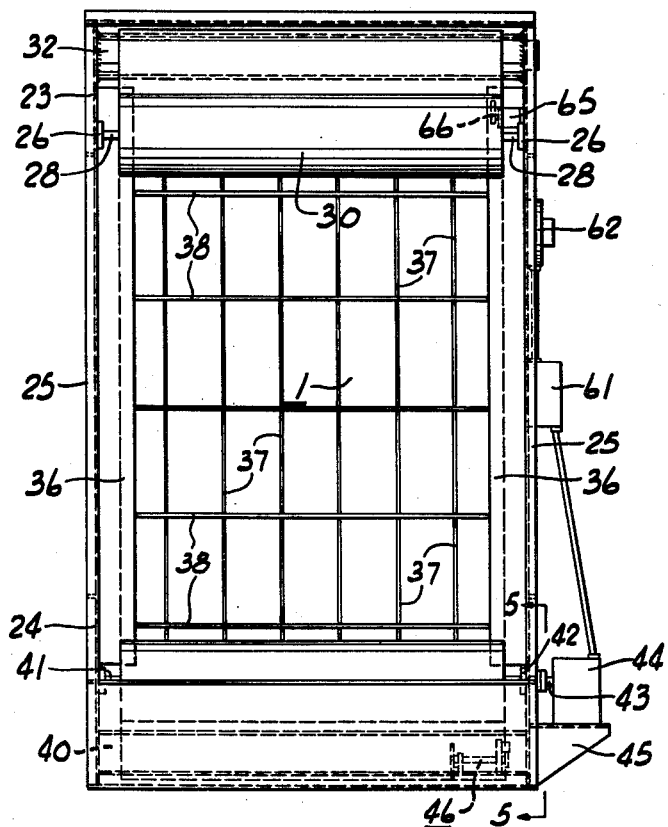
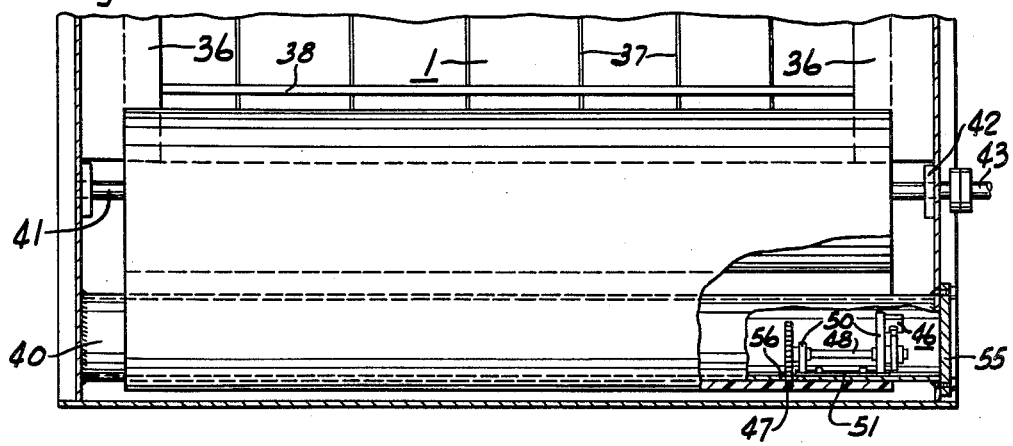

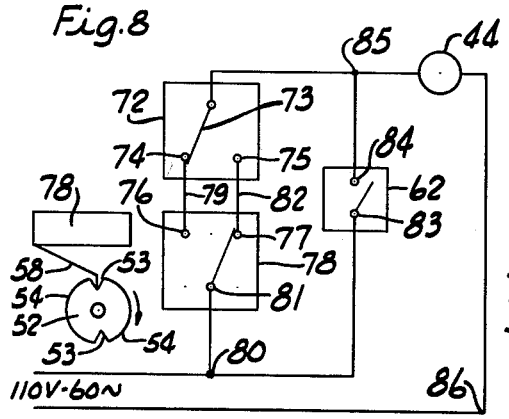
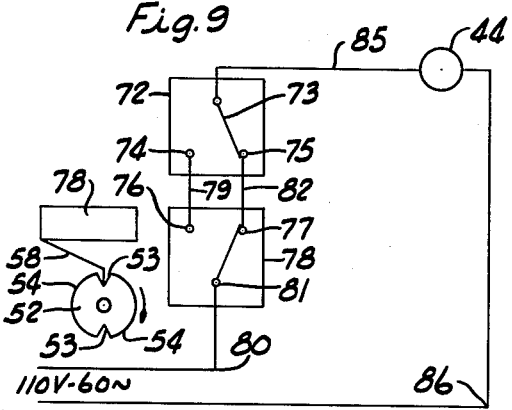
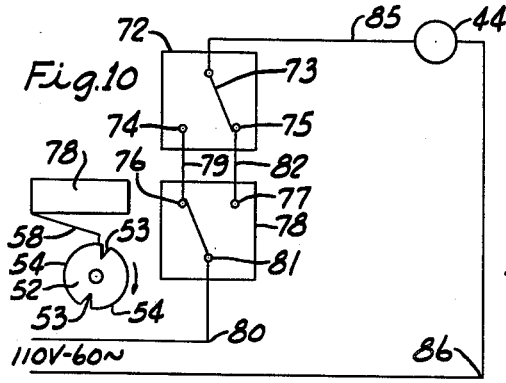
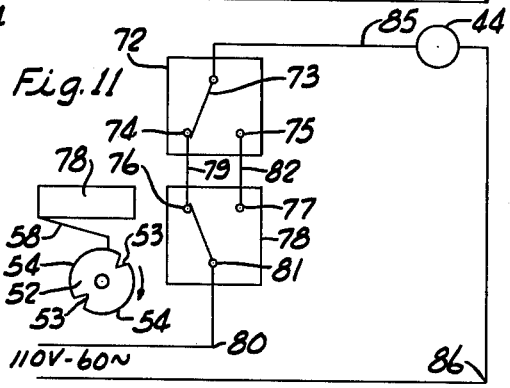
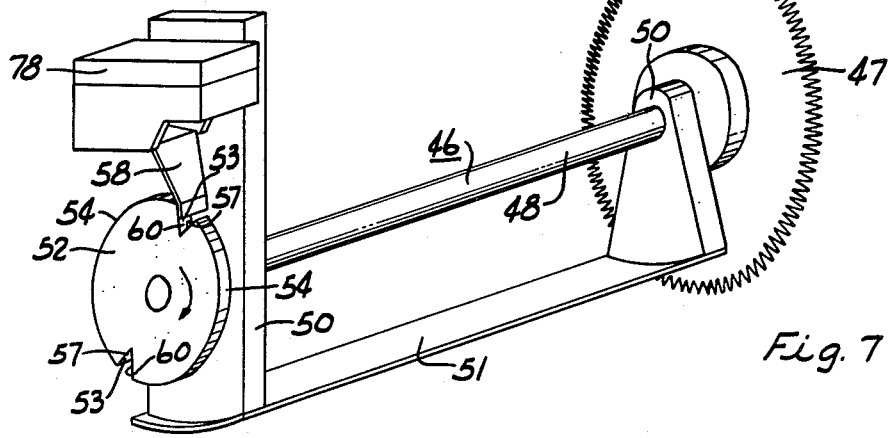
INVENTOR.
PAUL W. AITKENHEAD
HIS ATTORNEY

United States Patent Office 3,102,014
Patented Aug. 27, 1963

3,102,014
AIR FILTER CURTAIN
Paul W. Aitkenhead, Ross Township, Allegheny County, Pa., assignor to Electro-Air Cleaner Company, Inc., McKees Rocks, Pa., a corporation of Pennsylvania
Filed May 3, 1961, Ser. No. 113,588
3 Claims. (Cl. 55—271)

This invention relates generally to improvements in air filters and more particularly to a new filter curtain medium and the apparatus for containing and feeding the same across a passage through which the air to be cleaned flows.

The principal object of this invention is a novel air filter media constructed of a finely spun Fiberglas mat woven to dispose the fibers in waving and curling paths that are generally in one direction and in a criss cross diagonal pattern producing an open and interwoven mat having a gradation in the density of the glass fibers from one side to the other of the mat. The glass fibers forming this filter curtain or mat are coated with an adhesive such as tricresyl phosphate. The gradation of the glass fibers together with the wavy and curling structure of the glass gives it a flexible thickness of two inches which can be compressed to one-eighth of an inch. Approximately one-half of the fibers occupy approximately one-fourth of the expanded thickness of the curtain mat. The faces of the mat are relatively smooth, there being no apparent exposure of glass fiber ends that are present when the mat is cut longitudinally or transversely. This mat thus provides an open mesh for receiving the large particles of airborne dirt to give them free access into the mat which becomes increasingly dense to readily trap this dirt.

Another object is the provision of an improved machine for supporting and drawing the air filter curtain across a passage through which the air is forced. Generally the curtain is stored in rolls which are permitted to unreel as the curtain is drawn down across the air passage being threaded through a guide throat means and is wound up on a mandrel at the other end of the passage. When one roll is removed another is threaded through the guide throat means. To provide the proper tension on the curtain it is unwound from the roll and passes up and directly over and down the surface of a smooth stationary cornering tubular member. As the curtain passes downwardly from the top cornering tube, its sides pass into opposed channels of the same thickness of the curtain and the rods retain the opposite faces all of which form the guide throat means. The spaced longitudinally disposed rods form a grid that embraces the opposite sides of the curtain to keep it from bulging in the direction of the movement of the air. Thus the channels and the spaced grids define a guide throat means that transverses the air flow which may be at the air inlet or intermediate of an air duct but is preferably just prior to installation of an electronic air filter. Thus the prefilter curtain removes the large airborne dirt particles which prevents over or undue loading of the electronic air filter thereby increasing the operating efficiency of electronic filters and improved air filtering. The curtain then passes around the other or lower stationary cornering tubular member and laterally to a takeup mandrel which winds the curtain into a roll. When the expanded curtain is drawn off the supply roll and over the tubes there is sufficient tension and friction to slightly compress the curtain as it passes around the cornering tubes but it is fully expanded between the rolls and the tubes and when passing downwardly through the throat when under tension. If the tension is not sufficiently great a hinged friction plate may be rested against the supply roll to increase this tension. Normally a curtain or mat of glass fibers would be expected to reduce in thickness under tension and they generally do. However, the glass fiber curtain comprising this invention is expanded and made fluffy by stretching the same after it has been woven with the application of a bond and before plasticizing the bond. Further stretching does not contract the same.

In measuring the lineal movement of the filter curtain a rotatably supported tooth wheel is mounted on a shaft carried by spaced bearings on a support secured in one of the cornering tubes that has a transverse slot allowing the teeth of the wheel to engage the curtain and rotate the wheel. The shaft carries a cam that operates a switch that is accessible from the exterior of the machine. This cam switch measures the movement of the curtain and may be connected to interrupt the circuit of the motor winding up the curtain after having been initiated by a time clock contact or a high limit pressure switch. With a high and low limit pressure switch the tooth wheel may not be necessary.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a view in cross section of the air filter curtain comprising this invention.

FIG. 3 is a side elevation of an electronic air cleaner employing an air filter curtain comprising this invention.

FIG. 4 is a front elevation of the air filter curtain taken on the line 4—4 of FIG. 3.

FIG. 5 is an enlarged sectional view taken on the line 5—5 of FIG. 4 with parts in section broken away.

FIG. 6 is an enlarged sectional view taken on the line 6—6 of FIG. 3 with parts in section and parts broken away.

FIG. 7 is an enlarged perspective view of the device which measures the length of the movement of the air filter curtain.

FIGS. 8 to 11 are schematic diagrams of the different positions of the operating circuit controlling the movement of the air filter curtain.

Figure 1:
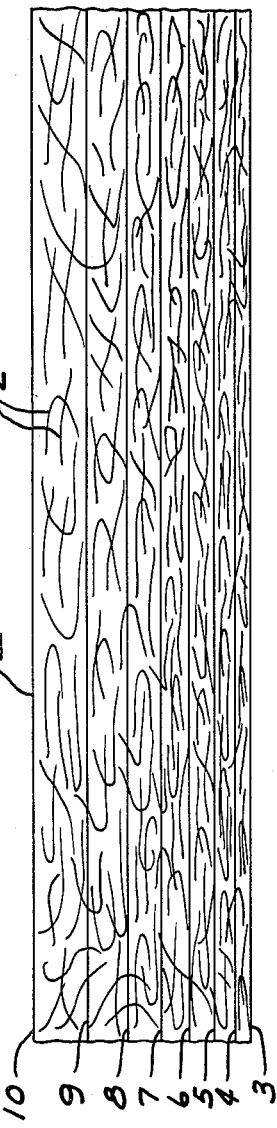
Figure 2:
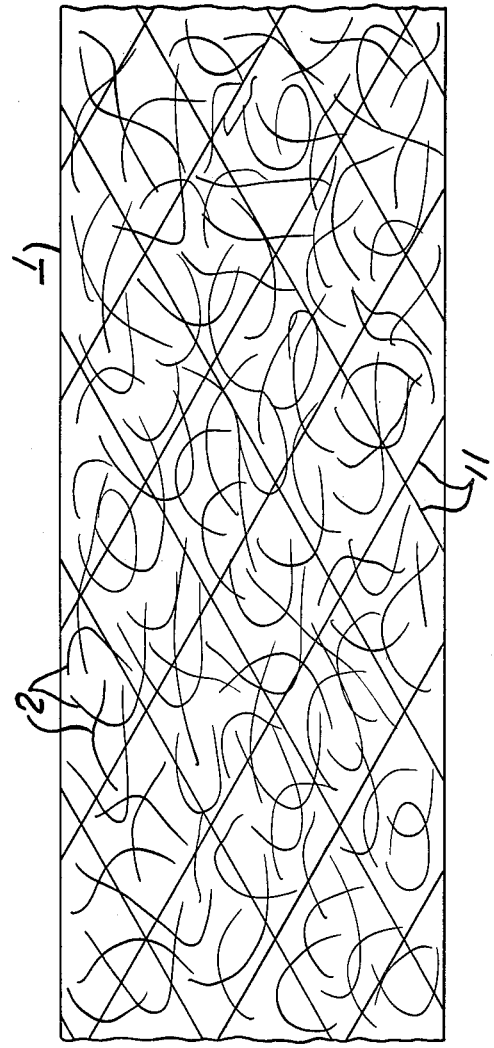
FIG. 2 is a plan view of the air filter curtain comprising this invention.

Referring particularly to FIGS. 1 and 2 the air filter curtain 1 is made of fine glass fibers 2 which are formed into a mat. This mat is made on a rotary drum. The glass fibers or filaments are spun from the plurality of orifices connected to a glass furnace and the glass filaments are accumulated on the rotary drum which is operated at a relatively high speed to continuously draw the fine filaments to a small diameter and wind the filaments on the drum. This action disposes the glass fibers generally longitudinally with the circumference of the drum. Either the rotating drum or the orifices spinning the glass filaments are moved transversely relative to each other to provide a criss cross pattern wherein the filaments cross each other at an acute angle. A circular movement is also given to the glass filaments as they are spun so that they create a pattern of arcuate glass filaments dispersed in short arcuate sections across the length of the drum. By controlling the speed of the drum a certain portion of the glass filaments may be made straight but the major portions of the glass fibers are made to lay in short arcuate paths on the drum and not mixed with orifices producing straight fibers which are merely spun back and forth across the drum to produce the criss cross layers. At the time of the spinning a bond is applied to the spun glass fibers on the drum and when the mat is completed it provides the appearance of layers of glass fibers defined by a criss cross pattern of substantially straight fibers which are interconnected by the arcuate glass fibers dispersed in all directions which interconnect a criss cross pattern laterally and subjacently each in both directions. The criss cross pattern defining more or less the different layers and when the mat is cut from the drum and stretched longitudinally of the criss cross pattern the mat expands and the control of the winding and the stretching produces a series of defined layers of glass fibers in the mat which become progressively closer together from one side of the mat to the other. As shown in FIG. 1 the criss cross pattern which defines the layers is represented by the numerals 3 to 10 inclusive. The first few layers between the criss cross patterns of 3 to 6 are quite close together and as the numbers progress the layers become increasingly larger ending at the top criss cross pattern 10 which represents the air entry side of the mat and into which the air is forced to pass from the entry as indicated by the criss cross pattern 10 to the discharge sides indicated by the criss cross pattern 3 and between these two criss cross patterns that define the opposite side of the mat the whole of the glass fiber structure becomes progressively of increased density to the discharge side of the mat because substantially the same amount of glass fibers are found between the criss cross patterns that define each layer and since the layers are progressively smaller it is obvious that the density increases towards the discharge surface 3. The progressive change in thickness of the layers may be on the order of a logarithmic scale. Thus as shown in FIG. 2 the criss cross pattern 11 has the acute angles in the direction of the rotation of the stretching of the mat and these criss cross fibers are interconnected by the arcuate glass fibers transversely of the mat 1 and as shown in FIG. 1 the cross fibers also are disposed up and down to interconnect the cross fibers defining the extent of each layer. Thus the arcuate fibers are dispersed in all directions and since the whole of the mat 1 is increased by stretching as illustrated in FIG. 1 it may then be passed through an oven to polymerize the bond and actually secure each fiber to an adjacent fiber where it touches the same when being polymerized. After polymerization the stretched mat is sufficiently long to make a curtain and may be wound on rolls for readily adapting the curtain to the machine. The curtain 1 may have any desired thickness depending upon the manner in which it is made. However, the curtain from one and three-quarter to two inches is found to be adequate as a pre-filter for an electronic air cleaner as such a curtain is sufficiently dense to break the detailed vision of an object through the curtain but the general outline may be seen with good lighting conditions. However, such a curtain is of increased density from one place to the other and readily admits large airborne particles and entraps them within the curtain in place of on the outer surface of the curtain as would be expected on filter curtains having a constant density throughout the thickness thereof.

Referring now to FIGS. 3 to 7 the air cleaner is shown at the end of the duct 12 through which the air is traveling to enter the frame 13 of the pre-filter carrying the curtain 1. The air passing through the curtain 1 travels through the intermediate chamber 14 thence through the electronic air cleaner chamber 15 which includes the spray or washing compartment 16 and the electronic air cleaner compartment 17. When the air travels from the electronic cleaner it passes out of the apparatus into the passageway 18 and thence to the blower where it is recirculated through the system. The intermediate chamber 14 has a door 20 through which one may step to make any alterations to the electronic cleaner indicated at 21 or the washer indicated at 22 or to change the rolls in supplying the curtain 1 in the frame 13. The door 20 is provided with interlocks to disrupt the circuit or cleaning operation when open during the period of their operation.

The pre-filter frame 13 is constructed in four sections, the top box-like sections 23, the bottom box-like section 24 and the sides 25 which are duplicates of one another, one being inverted. This permits one to employ the same top and bottom structures 23 and 24 and merely change the connecting side plates of the frame to accommodate duct work of different vertical dimensions, the top and bottom boxes being changed for a relatively few number of lateral dimensions.

The opposite sides of the box 23 are provided with the inturned arcuate track 26 having an opening at 27 for receiving the supports on the ends of the shaft 28 that support the curtain roll 30. The shaft or mandrel 28 with its end supports are dropped through the slots 27 at opposite sides of the arcuate track 26 and shoved over the high spot 31 of the track so as to rest in the position as shown in FIG. 3. The curtain is drawn from the roll 30 in a counter-clockwise direction and passes up over the corner tube 32 which has its ends welded to the opposite ends of the box 23 and is so-disposed that the curtain 1 will pass from the stationary corner tube 32 at a point of tangency where it will enter the throat 33 of the guide means that entrains the curtain as it passes downwardly past the opening extending from the point 34 of the top box 23 to the point 35 in the bottom box 24. The throat consists of the vertically disposed channel members 36 mounted on the sides 25 and the grill work on each side of the curtain which consists of spaced continuous vertical rods 37 backed up by transverse rails 38 formed in a frame that is removably mounted on the sides 25 on each side of the curtain. This throat 33 offers little or no resistance to the movement of the curtain 1 therethrough and after the curtain passes out of the throat below the opening 35 it travels around the lower corner tube 40 the ends of which are welded to the opposite ends of the lower box 24. After the curtain passes around this stationary tube it passes onto the mandrel 41 mounted on the lower box 24. As shown in FIG. 4, the mandrel 41 has a quick disconnecting coupling 42 for attaching the same to the shaft 43 of the motor 44 mounted on the bracket 45 that is secured to the lower outer face of the lower box 24. Thus the motor when energized winds the curtain in a clockwise direction on the mandrel 41 as viewed in FIG. 3.

As shown in FIG. 7 a cam switch 46 comprises the toothed wheel member 47 rotatably supported on the shaft 48 carried by the bearings 50 on the support 51. The opposite end of the shaft 48 having removably secured thereon the cam member 52 provided with the opposed notches 53 separating the cam surfaces 54. The support 51 is fastened to the inner surface of the tube 40 adjacent the end thereof and is accessible from the exterior of the machine through the plate 55 as shown in FIG. 6. A transverse slot 56 is cut through the tube 40 to permit the teeth of the wheel 47 to extend beyond the surface of the tube and engage in the glass fiber of the curtain 1 as it passes around the stationary tube 40. Thus the rotation of the wheel 47 is directly proportional to the lineal movement of the curtain 1 and the diameter of the wheel 47 may be chosen within the limits of the bore of the tube 40, to rotate the shaft 48 through a predetermined revolution or part thereof in proportion to the lineal movement of the curtain 1. Again the selection of the cam as to its diameter and the number and position of the notches 53 is also selected to provide operation of the cam in accordance with the lineal movement of the curtain 1. As shown in FIG. 7 each notch 53 has a substantially radial face 57 off which the cam follower 58 falls when the wheel and shaft is rotated in a clockwise direction in accordance with the arrow. The opposite cam face 60 slopes somewhat. The cam follower 58 is spring biased to move into the notches 53 when they present themselves as illustrated in FIG. 7. However, the device cannot be rotated in the opposite direction as the cam follower 58 functions as a stop against the movement of the cam 52. If the curtain were attempted to be pulled in the reverse direction the toothed wheel 47 would offer resistance against its moving in that direction.

As shown in FIGS. 3 and 4, a control box 61 provides the connections for controlling the operation of the motor 44 and the other controls of the filter curtain. Above the conrol box a pressure switch 62 is mounted which is provided with two tubes, the high pressure tube 63 opening to the passage in front of the curtain 1 and the low pressure tube 64 opening into the passage behind the curtain 1. This pressure switch is set to close a contact in response to a predetermined high pressure measured through the tube 63 and the switch will maintain its closed position until such time as the pressure in the low pressure tube 64 drops below a predetermined pressure which is lower than the predetermined high operating pressure.

These views also show a switch 65 having an arm with a roller 66 to engage the curtain 1 and when the curtain 1 passes beyond the roller 66 the switch 65 is caused to close for the purpose of completing a signalling circuit such as a light or an alarm or both to indicate that the roll 30 is empty and the curtain must be replaced before it passes the opening between points 34 and 35. A similar signal is provided in the paddle member 67 which is hingedly supported in the box 23 as indicated at 68 and it rests on the surface of the coil 30 of filter curtain having the pressure of its own weight and when the filter curtain roll 30 reduces in diameter the plate 67 strikes the switch 70 to close a signal circuit to indicate that the roll is practically depleted.

The control box 61 is provided with a clock timer 71 which may be set to operate and close a switch having a heel and two contacts engaged by the heel in its opposite positions. This time clock may be set to operate in periods within twenty-four hours and for any selected duration in throwing the heel of the switch to either of the two contacts. They may also be set for short periods of time of several minutes.

Referring to FIGS. 8 to 11 the clock switch 72 is provided with the heel member 73 that alternately engages the contacts 74 and 75. These contacts are directly connected to the respective contacts 76, 77 of the cam switch 78 that is operated by the actuator 58. As shown in FIG. 8, power supplied to the line 80 is connected to the heel 81 of the cam switch 78. This cam switch being illustrated with the operator in one of the slots 53 has the heel connected to the engaged contact 77. Thus voltage is provided from the contact 77 through the line 82 to the contact 75 of the clock switch. The line 80 is also connected to the pressure switch 62, the heel 83 of which is normally open and when closed will engage the contact 84. The line 85 is connected to the heel 73 of the clock switch 72 and to the contact 84 of the pressure switch 82 and to one side of the motor 44. The other side of the motor 44 is connected by the line 86 to the opposite side of the source of supply. When the pressure becomes greater than the predetermined setting the pressure switch 62 will close the contact between the heel 83 and the contact 84 and thereby energize the motor 44 to roll the curtain until such time as the pressure is reduced to a predetermined amount after which the switch 62 will open deenergizing the motor 44. Thus the pressure switch 62 functions in this instance independently of the timer switch or the cam switch and it may be employed to operate the system without the use of the timer switch 72 and the cam switch 78. If on the other hand, the pressure switch 62 shunts the timer switch and the cam switch as shown and the motor 44 is moved sufficiently far to rotate the cam 52 until it rides on the cam surface 54, the heel 81 will switch to the contact 76 and current will be supplied to the motor 44 through these parallel circuits. During this condition if the pressure switch 62 opens the motor 44 will continue to operate until the actuator 58 falls into a cam slot 53 causing the heel 81 to switch to the contact 77 and thereby stop the rotation of the motor. If the cam switch has not had an opportunity to allow the follower 58 to drop in a slot 53 before the period of time is up then the clock switch 72 will throw the heel 73 to the contact 75 and thus interrupt the circuit of the motor 44.

Referring now to FIG. 9 let it be assumed that the pressure switch 62 is disregarded and the clock switch 72 has passed through a selected interval of time. Its heel 73 is thrown to engage the contact 75 as shown and the motor 44 is started. When the motor 44 starts under these conditions the heel 81 of the cam switch 78 is thrown to the contact 76 when the follower 58 rides to the cam surface 54 as shown in FIG. 10. Thus the circuit to the motor 44 is again interrupted, yet the movement of the curtain was only a sufficient distance to raise the cam follower from the slot 53 to the cam surface 54 and since the motor 44 is deenergized there will be no further movement of the curtain until the clock has passed through its predetermined period of time to again throw the heel 73 to the contact 74 as shown in FIG. 11 at which time the motor 44 is again energized to continue the movement of the curtain 1 until the follower 58 again falls in the next consecutive slot 53 after traversing the whole of the distance of the cam 54. This distance represents a considerable movement of the curtain such as a lineal distance of from four to five inches. When the follower 58 reaches the next consecutive slot 53 and drops therein the heel 81 is again switched to the contact 77 as shown in FIG. 8 and no further material movement of the curtain 1 will be produced until the passage of the two consecutive time periods of the clock as previously recited with reference to the settings of FIGS. 9 to 11.

These periods may of course be changed. The lineal movement of the curtain 1 may be selected to be greater or less than that previously described.

The movement of the toothed wheel 47 by means of the curtain traveling in the proper direction creates little or no load on the motor when drawing the curtain around two stationary corner tubes 32 and 40. These stationary corner tubes provide a material improvement in this machine in that the curtain is maintained in better alignment than that experienced by using a roll or a paddle wheel structure wherein slight variations of the curtain itself tend to shift the curtain askew which is a similar difficulty experienced in traveling belts over rotary members. The resistance to movement of the curtain over the stationary corner tubes even though this is a frictional engagement is exceedingly low not being far from the friction of a roller or paddle type of members at the same relative position.

I claim:

1. A filter curtain of fine glass fibers to be drawn across a passage through which the air to be cleaned travels in one direction which curtain consists of a mat made of a plurality of layers of glass fibers extending generally longitudinal, each layer being defined by the relatively straight glass fibers lying in a criss cross pattern forming an acute angle with each other, the major portion of the glass fibers being arcuate and dispersed in all directions to interconnect the criss cross pattern defining the adjacent layers of the mat, the defined layers of glass fibers becoming progressively closer together from the air entry side of the mat to the air discharge side of the mat to provide a progressive increase in the density of the glass fibers through the mat, a frame encircling the passage, guide means supported by said frame to channel the curtain as it passes across the passage, a transversely disposed stationary cornering tube mounted on said frame at each end of said guide means to maintain the alignment of the curtain as it passes over the tubes upon entering and leaving said guide means, a supply and take-up adjacent said tubes, and motor means for actuating said take-up, control means to energize said motor, a rotatably supported toothed wheel mounted on a shaft carried by bearings on a support secured in one cornering tube, said tube having a slot and the teeth of said wheel extending through said slot to engage the curtain moving over said cornering tube, a cam on said wheel shaft, a cam switch on said support operated by said cam to function in a circuit of said control means as a measure of the movement of said curtain.

2. The filter curtain and apparatus of claim 1 characterized in that said control means includes a time clock switch having two contacts and a heel to alternately connect the same after predetermined time intervals, said cam switch also having two contacts and a heel to alternately connect the same upon different depressions and elevations of said cam, a circuit including parallel connections between the contacts in each switch, a source of supply connected to the switch of one heel and the other heel connected to the motor and a ground return to energize the motor after a predetermined time setting of the time clock switch and deenergize the motor after a predetermined length movement of the curtain by the tooth wheel actuated cam switch.

3. The filter curtain and apparatus of claim 2 characterized by a pressure switch having a contact which closes at a predetermined high pressure in the passage and opens after the pressure in the passage drops to a predetermined pressure below that required to close the switch, and a circuit connecting said pressure switch to shunt said time clock switch and said cam switch to start and stop said motor under high pressure conditions regardless of the time clock switch setting.

References Cited in the file of this patent

UNITED STATES PATENTS

| | | |
|---|---|---|
| 2,546,230 | Modigliani | Mar. 27, 1951 |
| 2,807,330 | Rivers | Sept. 24, 1957 |
| 2,848,064 | Gregory | Aug. 19, 1958 |
| 2,853,155 | Peter | Sept. 23, 1958 |
| 2,980,204 | Jordan | Apr. 18, 1961 |